(12) United States Patent
Meggiolan et al.

(10) Patent No.: US 10,487,894 B2
(45) Date of Patent: Nov. 26, 2019

(54) PAD FOR A BICYCLE DISC BRAKE

(71) Applicant: Campagnolo S.r.l., Vicenza (IT)

(72) Inventors: Mario Meggiolan, Creazzo (IT);
Filippo Bove, Padua (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/889,812

(22) Filed: Feb. 6, 2018

(65) Prior Publication Data
US 2018/0223927 A1    Aug. 9, 2018

(30) Foreign Application Priority Data
Feb. 7, 2017   (IT) .................. 102017000013292

(51) Int. Cl.
   *F16D 65/097*   (2006.01)
   *B32B 15/14*    (2006.01)
   *B62L 1/00*     (2006.01)
   *F16D 65/092*   (2006.01)

(52) U.S. Cl.
   CPC .......... *F16D 65/0972* (2013.01); *B32B 15/14* (2013.01); *B62L 1/005* (2013.01); *F16D 65/092* (2013.01); *F16D 2200/0004* (2013.01); *F16D 2200/0056* (2013.01); *F16D 2250/0084* (2013.01)

(58) Field of Classification Search
   CPC .............. F16D 65/0972; F16D 65/092; F16D 65/0006; F16D 65/0971; F16D 2200/0056
   USPC ................. 188/73.36, 73.37, 73.38
   See application file for complete search history.

(56) References Cited

U.S. PATENT DOCUMENTS

| | | | |
|---|---|---|---|
| 4,093,045 A * | 6/1978 | Kawamura | F16D 65/0006 188/73.37 |
| 4,513,844 A * | 4/1985 | Hoffman, Jr. | F16D 65/0006 188/264 G |
| 4,846,312 A * | 7/1989 | Sweetmore | F16D 65/0006 188/73.1 |
| 5,099,962 A | 3/1992 | Furusu et al. | |
| 5,535,858 A * | 7/1996 | Hummel | F16D 65/0006 188/250 B |
| 5,975,252 A * | 11/1999 | Suzuki | F16D 55/227 188/1.11 W |
| 6,056,091 A * | 5/2000 | Krug | F16D 65/0006 188/250 B |
| 6,105,736 A * | 8/2000 | Akita | F16D 65/0006 188/251 A |
| 6,913,120 B2 * | 7/2005 | Bosco | F16D 65/092 188/250 E |

(Continued)

FOREIGN PATENT DOCUMENTS

| | | |
|---|---|---|
| EP | 0859163 A1 | 8/1998 |
| EP | 1197323 A1 | 4/2002 |

(Continued)

OTHER PUBLICATIONS

Italian Search Report and Written Opinion in Italian Application No. 102017000013292, dated Oct. 5, 2017, with English translation.

*Primary Examiner* — Thomas W Irvin
(74) *Attorney, Agent, or Firm* — Volpe and Koenig, P.C.

(57) ABSTRACT

A bicycle disc brake pad has a support frame, a friction-wearing material element and a vibration damping element associated with the support frame.

18 Claims, 15 Drawing Sheets

(56) References Cited

U.S. PATENT DOCUMENTS

| | | | | |
|---|---|---|---|---|
| 7,481,304 | B2* | 1/2009 | Tsurumi | F16D 65/0979 188/250 E |
| 7,568,561 | B2* | 8/2009 | Bosco, Jr. | F16D 65/092 188/250 B |
| 7,926,627 | B2* | 4/2011 | Wake | F16D 65/092 188/250 B |
| 8,225,911 | B2* | 7/2012 | Lin | F16D 65/092 188/250 E |
| 8,714,319 | B2* | 5/2014 | Suzuki | F16D 65/0979 188/250 E |
| 8,869,955 | B2* | 10/2014 | Parild | F16D 65/0006 188/251 A |
| 8,925,690 | B2* | 1/2015 | Ogawa | F16D 65/095 188/73.1 |
| 9,027,716 | B2* | 5/2015 | Tanabe | F16D 65/02 188/250 B |
| 9,140,322 | B2* | 9/2015 | Kobayashi | F16D 65/095 |
| 9,279,465 | B2* | 3/2016 | Kobayashi | F16D 65/092 |
| 9,664,244 | B2* | 5/2017 | Osada | F16D 55/225 |
| 10,041,554 | B2* | 8/2018 | Ishikawa | F16D 65/092 |
| 2003/0221919 | A1* | 12/2003 | Kumamoto | F16D 65/0006 188/73.37 |
| 2009/0000880 | A1* | 1/2009 | Noguchi | F16D 65/0971 188/71.7 |
| 2012/0073915 | A1* | 3/2012 | Kahan | F16D 65/0971 188/73.37 |
| 2012/0152668 | A1* | 6/2012 | Santamaria Razo | F16D 65/0006 188/251 R |
| 2013/0001025 | A1 | 1/2013 | Tanabe et al. | |
| 2014/0339028 | A1* | 11/2014 | Kobayashi | F16D 65/092 188/250 B |

FOREIGN PATENT DOCUMENTS

| | | |
|---|---|---|
| JP | S60157526 A | 8/1985 |
| JP | 2005207443 A | 8/2005 |

* cited by examiner

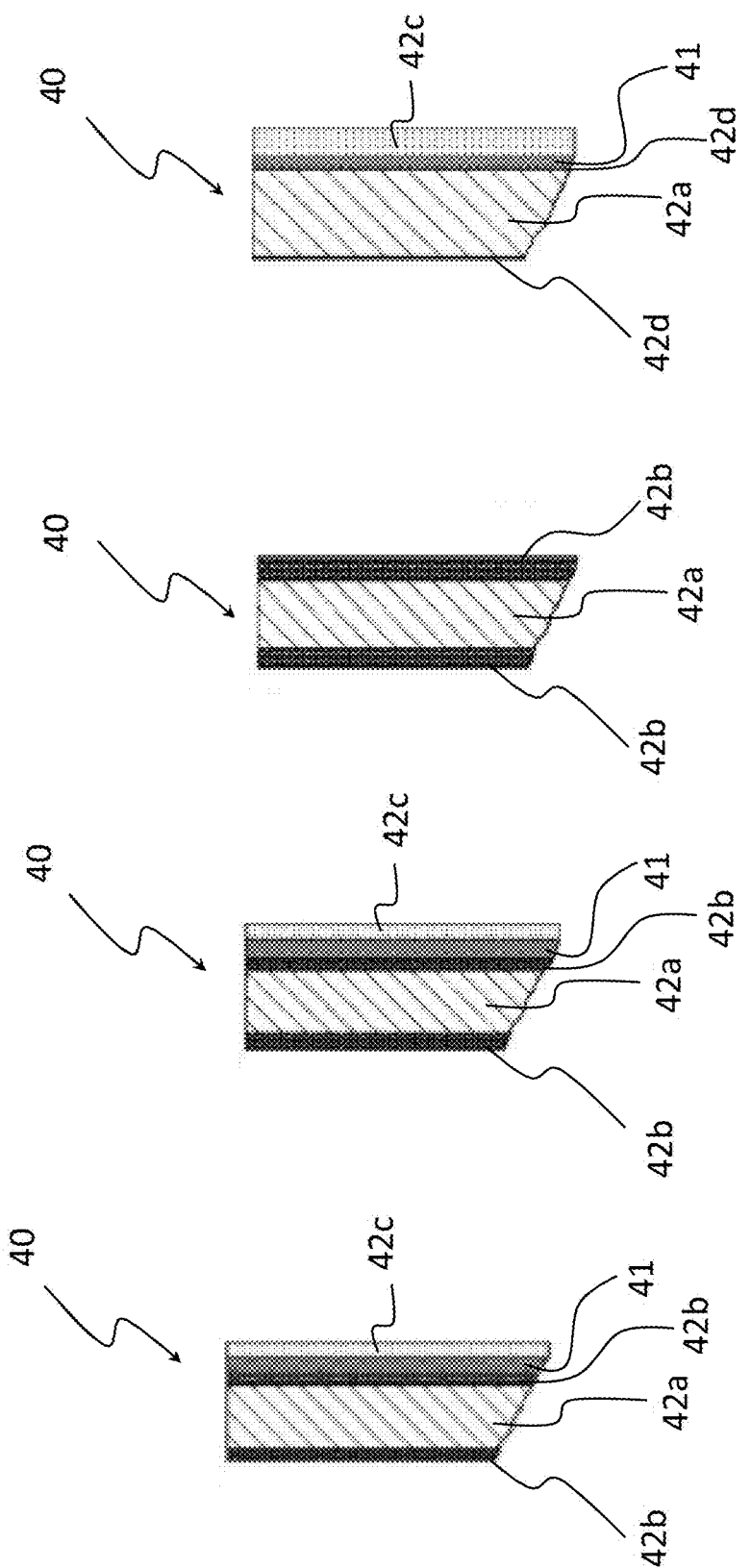

US 10,487,894 B2

PAD FOR A BICYCLE DISC BRAKE

CROSS REFERENCE TO RELATED APPLICATION

This application claims the benefit of Italian Application No. 102017000013292, filed on Feb. 7, 2017, which is incorporated herein by reference as if fully set forth.

FIELD OF INVENTION

The present invention relates to a pad for a bicycle disc brake.

BACKGROUND

As known, disc brakes are now commonly used in bicycles. Such brakes are indeed often preferred to conventional brakes of a different type in that they ensure a high braking force and, particularly, an improved braking modularity, so as to avoid or limit the problems caused by mud or water.

Typically, a disc brake comprises a caliper mounted onto the frame of the bicycle and a brake disc mounted on the hub of the wheel. Inside the caliper there are at least two opposite pads. The brake disc rotates inside the space defined between the opposite pads. By actuating the brake lever, the opposite pads are brought towards the brake disc, generating friction on the brake disc and, consequently, braking the wheel.

Mechanically-controlled disc brakes and hydraulically-controlled disc brakes are known. In the former the movement of the pads following the actuation of the brake lever takes place through the effect of a pulling action exerted by a metallic cable associated with the brake lever and with the caliper that supports the pads. In the latter the movement of the pads takes place through the effect of the pushing action exerted by a hydraulic piston on each pad.

Each pad typically comprises a support frame configured to be coupled with the caliper and an element made of friction-wearing material associated with a face of the support frame and configured to slide on the brake disc during braking, generating some noise.

SUMMARY

The Applicant observed that during braking the pads can be subjected to vibrations that can alter the correct positioning of the element made of friction-wearing material on the support frame and/or the contact between the element made of friction-wearing material and the brake disc, reducing the braking efficiency.

The Applicant considered the problem of eliminating the aforementioned vibrations, or at least reducing the extent thereof as much as possible, and found that such a problem is solved by providing the pad with an element configured to dampen the vibrations.

The Applicant verified that the aforementioned vibration damping element considerably, if not totally, absorbs the vibrations that can be generated on the pad when the brake is actuated, preventing such vibrations from negatively influencing the braking.

The present invention therefore relates to a pad for a bicycle disc brake, the pad comprising a support frame and an element made of friction-wearing material associated with said support frame, characterized in that the pad comprises a vibration damping element associated with said support frame.

BRIEF DESCRIPTION OF THE DRAWINGS

The features and advantages of the invention will become clearer from the description of preferred embodiments thereof, made with reference to the attached drawings, wherein:

FIGS. 15a-15d are cross section views of a portion of four alternative embodiments of a vibration damping element used in the pad of the present invention.

DETAILED DESCRIPTION OF THE PREFERRED EMBODIMENTS

Figure 1:
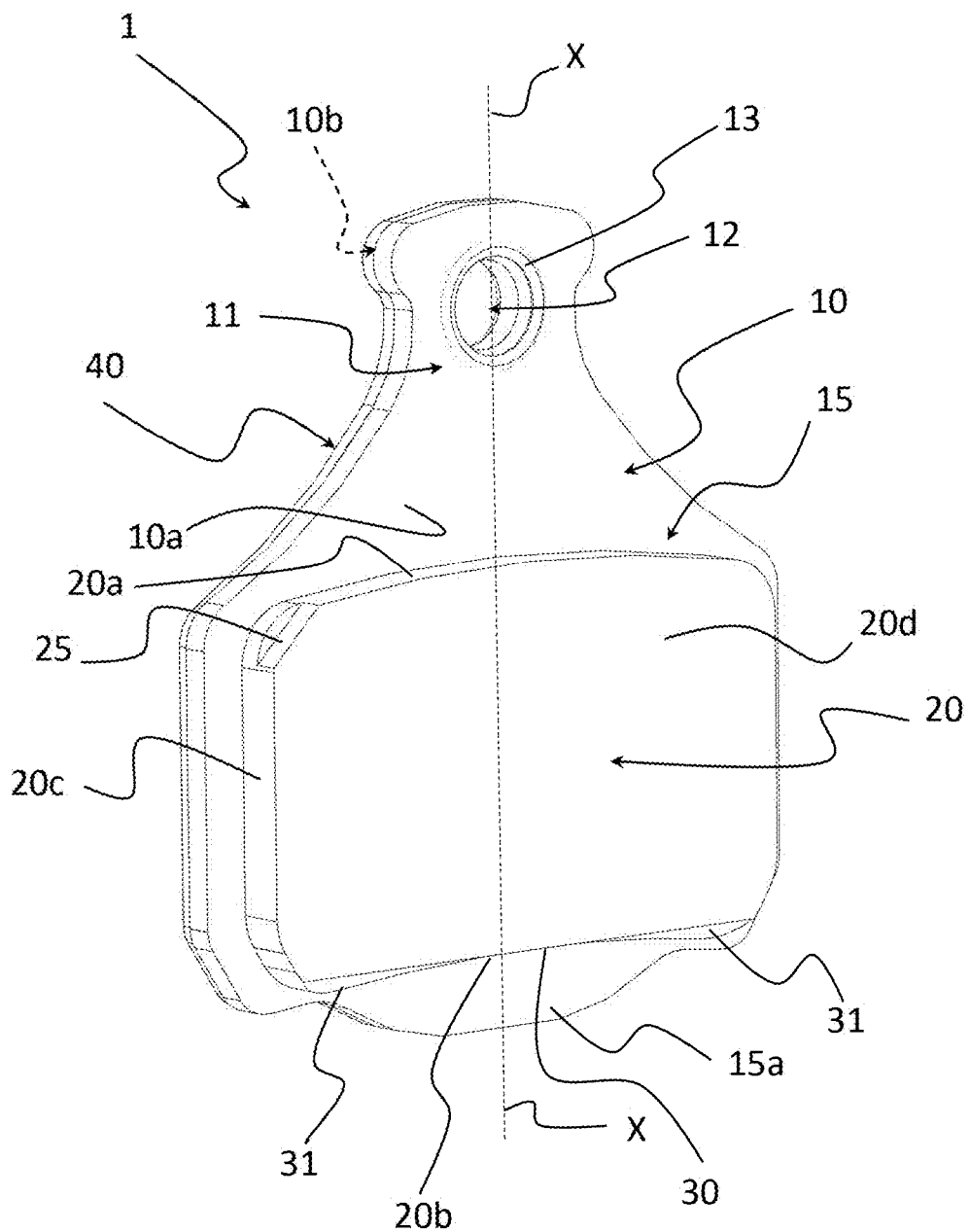
FIG. 1 is a front schematic perspective view of a first embodiment of a pad for a bicycle disc brake in accordance with the present invention.

Throughout the present description and in the following claims, the expressions "upper", "lower" and "side" are used with reference to the position taken up by the pad when it is mounted on the caliper of the disc brake and such a caliper is mounted on the frame of the bicycle. In such a position, the orientation of the pad is substantially that the one represented in the figures attached to the present description and described below. The terms "front" or "outer" and "rear" or "inner" are used to indicate the part of the pad facing towards the brake disc and the opposite part of the pad, respectively.

In the attached figures, reference numeral 1 indicates a pad for a bicycle disc brake in accordance with the present invention. The pad 1 has a support frame and an element made of friction-wearing material associated with the support frame. The pad also has a vibration damping element associated with the support frame.

Preferably, the element made of friction-wearing material is associated with a first face of the support frame and the vibration damping element is associated with a second face of the support frame opposite to said first face. The vibration damping element therefore does not physically interfere with the element made of friction-wearing material. In this way, the vibrations damping action and the braking action are functionally independent from one another, so that each of the aforementioned actions is carried out with the maximum efficiency.

Preferably, the vibration damping element is glued to said support frame.

More preferably, the vibration damping element comprises a pressure-sensitive adhesive layer attached to the support frame. Said adhesive layer can comprise a layer of hot-adhesive material or a layer of cold-adhesive material. In this last case, the vibration damping element preferably comprises a removable film associated with said layer of cold-adhesive material and intended to be removed before applying the vibration damping element on the support frame.

The Applicant has found that the use of a cold-adhesive material is particularly preferred since the adhesive behavior remains substantially identical as the temperature changes.

Preferably, the compound of the element made of friction-wearing material is deposited so that it penetrates, at least in part, in the support frame. This makes it possible to have a pad that is more resistant to the shearing stresses generated during braking. In fact, in the absence of such interpenetration, the detachment of the element made of friction-wearing material from the support frame could occur.

Preferably, the element made of friction-wearing material and the vibration damping element comprise respective inner surfaces in contact with the support frame, and at least one part of the inner surface of the vibration damping element is in contact with at least one part of the inner surface of the element made of friction-wearing material.

Advantageously, this produces the effect of having a direct damping of the vibrations.

Preferably, the vibration damping element comprises at least one layer of metallic material. The Applicant has found that the provision of such a layer is particularly advantageous to achieve an effective damping of the vibrations.

In a preferred embodiment, said at least one layer of metallic material is associated with at least one layer of anti-rust material. Preferably, said at least one layer of metallic material is arranged between two layers of anti-rust material. This allows to maintain an effective vibration damping action even after a possible prolonged contact of the pad with mud or water.

In an alternative embodiment, said at least one layer of metallic material is associated with at least one layer of rubber, which preferably is a fluoropolymer. More preferably, said at least one layer of metallic material is arranged between two layers of rubber.

Further embodiments can be provided in which the vibration damping element comprises, in addition to the aforementioned layer of metallic material, both two layers of anti-rust material and two layers of rubber, or a single layer of anti-rust material and two layers of rubber, or a single layer of rubber and two layers of anti-rust material. The mutual positioning of the aforementioned layers of anti-rust material and of rubber and the positioning of such layers with respect to the layer of metallic material can be whatever.

In some embodiments, the support frame has an outer profile having a predetermined shape and the vibration damping element has an outer profile having a shape substantially identical to the shape of the outer profile of said support frame. In such a case the vibration damping element has, on a plane parallel to that of the support frame, a high extension, so as to effectively carry out its vibration damping action, such an extension nevertheless being no greater than that of the support frame, so as not to require that the operator takes special provisions or precautions during the mounting of the pad on the caliper of the disc brake.

Preferably, the support frame comprises a housing seat for housing the vibration damping element. Such a seat makes it possible to avoid undesired movements of the vibration damping element with respect to the support frame and, consequently, to avoid a reduction of the efficiency of the vibration damping action and/or a disadvantageous interference with the braking action carried out by the element made of friction-wearing material.

Preferably, the housing seat has a depth greater than the thickness of the vibration damping element. In this way the vibration damping element remains housed in the seat also in the case in which it deforms and detaches from the support frame, thus achieving the advantages discussed above.

In a first embodiment, the housing seat has at least in part a substantially circular shape.

In this case, preferably the vibration damping element has a substantially circular shape.

In preferred embodiments, the housing seat comprises opposite shoulders configured to go into abutment against opposite side walls of the vibration damping element.

In this case, preferably the vibration damping element has a substantially polyhedral shape.

The shoulders preferably have a depth greater than the thickness of the vibration damping element so as to remain in abutment on the vibration damping element also in the case in which it deforms and detaches from the support frame, thus avoiding undesired displacements of the vibration damping element with respect to the support frame.

Preferably, the vibration damping element comprises a first end portion that projects with respect to said support frame.

Preferably, said first end portion is defined at a lower portion of said vibration damping element.

The aforementioned first end portion can have an increased thickness, so as to act in practice as an indicator of the degree of wear of the element made of friction-wearing material. Indeed, as the element made of friction-wearing material is consumed the aforementioned first end portion gets ever closer to the brake disc until it makes contact with the brake disc when the element made of friction-wearing material reaches an excessive degree of wear. In such a circumstance, a noise is generated that indicates to the user that the pad should or must be changed.

In some preferred embodiments, said first end portion is folded over said first face. In this way a fold is made on the vibration damping element that, in addition to act as an indicator of the degree of wear of the element made of friction-wearing material, acts as further mechanical coupling element between vibration damping element and support frame.

In some preferred embodiments, the support frame comprises a through opening and the vibration damping element comprises a second end portion inserted in said through opening and folded over said first face. In this way, a further fold is made on the vibration damping element that in practice constitutes both a further shoulder for the vibration damping element and a further mechanical coupling element between vibration damping element and support frame.

Preferably, the aforementioned second portion is defined at the opposite part to the aforementioned first end portion with reference to said element made of friction-wearing material. The element made of friction-wearing material is in this case arranged between said first end portion and second end portion of said vibration damping element.

In other embodiments, the support frame comprises a first through hole for the attachment of the pad to a caliper of the disc brake and said vibration damping element comprises a second through hole, aligned with said first through hole.

Preferably, a fixing element is inserted in said first through hole and second through hole. Such a fixing element is preferably a perforated rivet. The aforementioned fixing element constitutes a further mechanical coupling element between vibration damping element and support frame and allows the stable coupling of the pad with the caliper of the disc brake.

Preferably, the second through hole is formed in a third end portion of the vibration damping element, said third end portion having a part folded over said first face and comprising a third through hole aligned with said first through hole and second through hole. The aforementioned fixing element therefore passes through the through hole of the portion of vibration damping element associated with the aforementioned second face of the support frame, the through hole of the support frame and the through hole of the portion of vibration damping element folded over the aforementioned first face of the support frame.

Preferably, said third end portion is defined at the opposite part to said first end portion, with reference to said element made of friction-wearing material.

The aforementioned disc brake, not shown, comprises a caliper configured to be associated with the frame of a bicycle and a brake disc configured to be associated with a hub of a front or rear wheel of the bicycle.

Inside the caliper there are at least two opposite pads 1 in accordance with the present invention.

Advantageously, the weight of the pad object of the invention, obviously when it is new, is comprised between about 6 grams and about 20 grams, the extreme values being included.

Advantageously, its thickness, again when it is new, is comprised between about 2 mm and about 5 mm, the extreme values being included, and preferably is substantially equal to about 5 mm.

Figure 2:
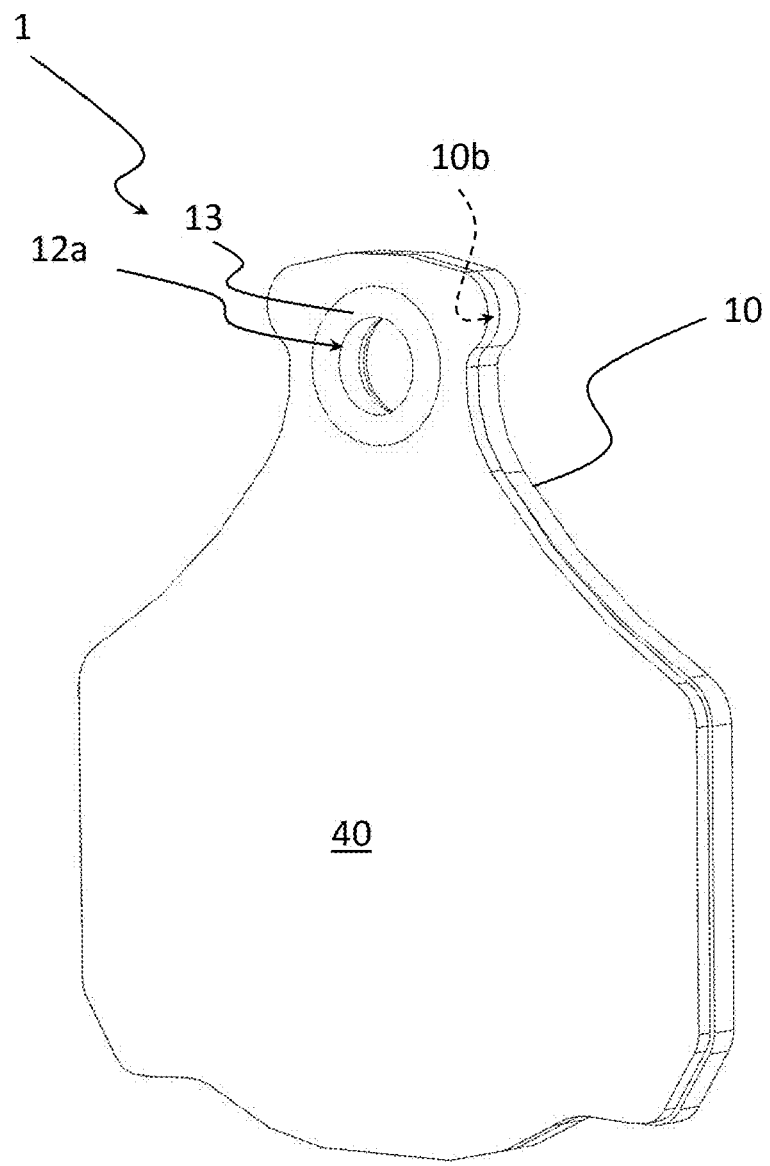
FIG. 2 is a rear schematic perspective view of the pad of FIG. 1.
Figure 3:
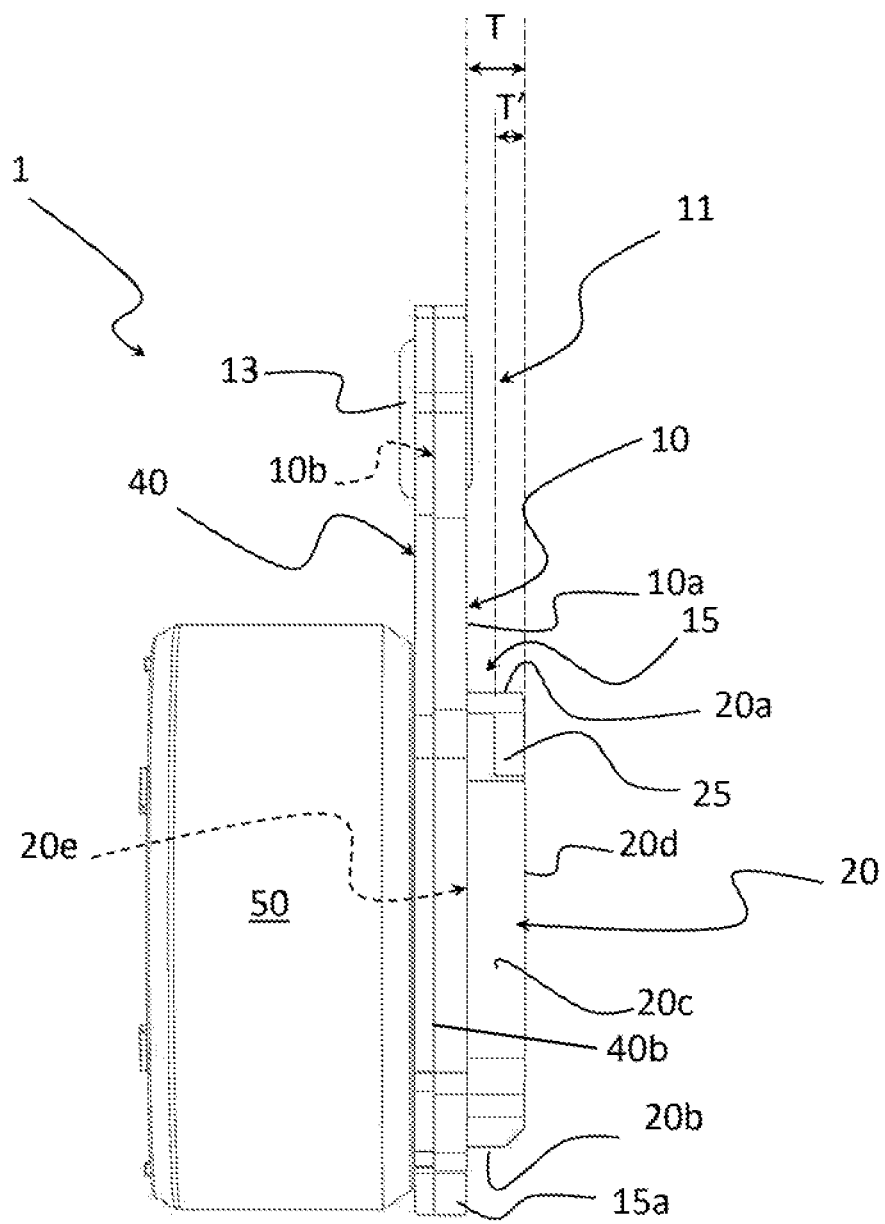
FIG. 3 is an orthogonal side view of the pad of FIG. 1 associated with a pneumatic piston of a brake caliper.

With reference to FIGS. 1-3, the pad 1 comprises a support frame 10 configured to be associated with the aforementioned caliper.

An element made of friction-wearing material 20 is associated with a first face 10a of the support frame 10.

A vibration damping element 40 is associated with a second face 10b of the support frame 10, opposite to the first face 10a.

In FIGS. 1-3 the face 10b cannot be seen since it is entirely covered by the vibration damping element 40, which in this case has an outer profile having a shape substantially identical to the shape of the outer profile of the support frame 10.

The support frame 10 is made of a metallic material.

The support frame 10 comprises a portion 11 for fastening to the caliper and a portion 15 for supporting the element made of friction-wearing material 20.

The portion 11 for fastening to the caliper comprises a through hole 12 for housing a pin configured to support the pad 1 on the caliper of the disc brake.

The support frame 10 preferably has a symmetrical shape with respect to a transversal middle plane X-X that passes through the center of the through hole 12.

The support portion 15 of the element made of friction-wearing material 20 has a substantially parallelepiped shape and has a lower part 15a whose central area extends downwards.

Figure 12:
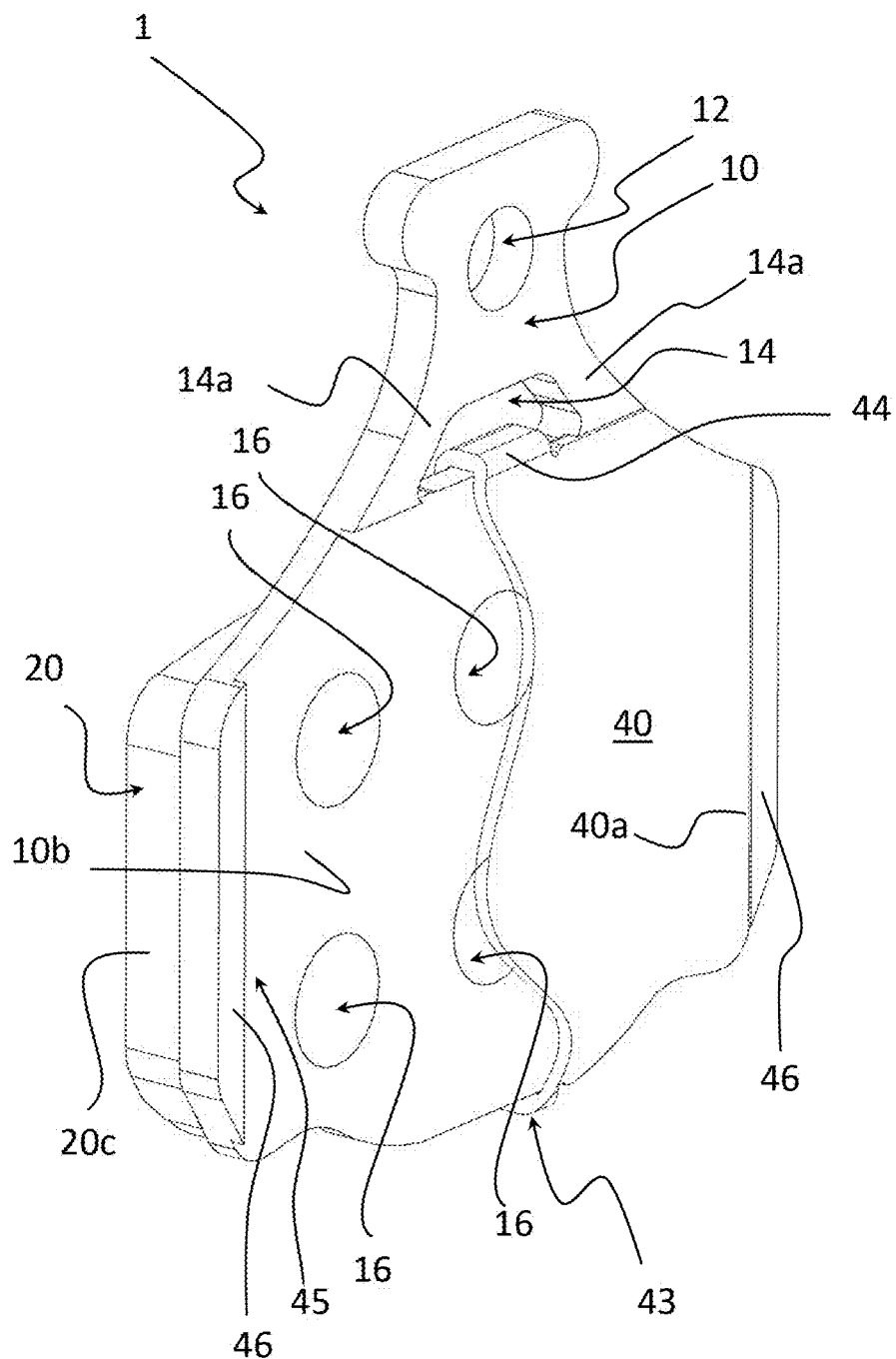
FIG. 12 is a rear schematic perspective view of the pad of FIG. 9, such a view being analogous to that of FIG. 10, wherein the pad is partially sectioned with a longitudinal tear.

The support frame 10 preferably has, at its portion 15 for supporting the element made of friction-wearing material 20, a plurality of holes 16 (which can be seen in FIG. 12) through which the compound of the element made of friction-wearing material 20 penetrates into the support frame 10 itself, thus providing the pad 1 with a high shear strength.

A through opening 14 can be formed in the support frame 10, as described and shown with reference to FIGS. 9-14. Such an opening 14 in this case acts as a weight-reduction opening.

The element made of friction-wearing material 20 is made of organic materials, like for example glass fibers or copper fibers with resins, or of metallic materials, like for example sintered metallic powders.

The element made of friction-wearing material 20 has a substantially parallelepiped shape. It comprises an upper surface 20a, a lower surface 20b substantially parallel to the upper surface 20a, a pair of opposite side surfaces 20c substantially perpendicular to the upper and lower surfaces 20a, 20b, a front (or outer) surface 20d and a rear (or inner) surface 20e substantially parallel to the front (or outer) surface 20d.

The upper and lower surfaces 20a, 20b are preferably slightly concave.

As shown in FIG. 3, the element made of friction-wearing material 20 has a predetermined thickness T. A front portion of the element made of friction-wearing material 20 defines a portion of normal wear of the element made of friction-wearing material 20. Such a portion of normal wear corresponds to the portion of the element made of friction-wearing material 20 that is considered to be able to be subjected to wear without the need to replace the pad 1. Such a front portion has a thickness T' typically comprised between about 40% and about 75% of the thickness T, for example equal to about 60% of the thickness T.

The element made of friction-wearing material 20 comprises, in a side end area of the upper portion thereof, a visual wear indicator 25. In particular, the visual wear indicator 25 is defined at a joining edge of the upper surface 20a and of one of the side surfaces 20c of the element made of friction-wearing material 20.

There are alternative embodiments to the one shown in the attached drawings in which the visual wear indicator 25 is provided on both the side end areas of the upper portion of the element made of friction-wearing material 20, or in any case again on the upper portion of the element made of friction-wearing material 20 but in a position different from the one shown in FIGS. 1-3.

The visual wear indicator 25 is obtained by partial removal of material, for example through milling. It defines in the element made of friction-wearing material 20 a step having a height lower than the thickness of the element made of friction-wearing material 20. As the thickness of the element made of friction-wearing material 20 progressively reduces upon friction with the brake disc, the height of the aforementioned step reduces, providing the cyclist with a visual indication of the degree of wear of the element made of friction-wearing material 20.

The element made of friction-wearing material 20 comprises a beveled lower portion.

Such a beveled lower portion extends continuously along the entire lower surface 20*b* of the element made of friction-wearing material 20 and comprises a central area having a first tapering 30 and opposite side end areas each having a second tapering 31.

Alternative embodiments of the pad 1 of the present invention are provided, wherein the tapering 31 is defined only at one of the opposite side end areas of the lower surface 20*b* of the element made of friction-wearing material 20.

The tapering 31 is defined at the opposite joining edges of the lower surface 20*b* and of the side surfaces 20*c* of the element made of friction-wearing material 20 and extends from the lower surface 20*b* towards the upper surface 20*a* of the element made of friction-wearing material 20 more than the tapering 30.

Moving progressively from the central area to the opposite side end areas, the tapering 30 extends downwards increasingly until it joins the tapering 31. The latter extends towards the upper surface 20*a* progressively moving towards the side surfaces 20*c* of the element made of friction-wearing material 20.

The vibration damping element 40 can have a structure with overlapping layers. The number of layers, the thickness and the material of each layer can vary as a function of the heat resistance and the required frequencies to be damped.

For example, in the embodiments shown in FIGS. 15*a*, 15*b* and 15*c* the vibration damping element 40 comprises a layer of metallic material 42*a* arranged between two layers of rubber 42*b*. Preferably, the metallic material is carbon steel and the rubber is nitrile rubber.

The vibration damping element 40 of FIGS. 15*a*, 15*b* and 15*c* further comprises a layer of pressure-sensitive adhesive material 41 associated with one of the aforementioned two layers of rubber 42*b* and intended to be attached to the support frame 10.

In the case in which, a layer of cold-adhesive material is used, like in the examples of FIGS. 15*a* and 15*b*, the vibration damping element 40 preferably further comprises a film 42*c* made of plastic material applied to the layer of pressure-sensitive adhesive material 41 and intended to be removed before gluing the vibration damping element 40 on the support frame 10.

On the other hand, in the case in which a layer of hot-adhesive material is used, like in the example of FIG. 15*c*, the aforementioned film 42*c* is not necessary.

In the embodiment of FIG. 15*a*, the layer of metallic material 42*a* has a thickness for example equal to about 0.40 mm, each of the two layers of rubber 42*b* has a thickness for example equal to about 0.05 mm, the layer of pressure-sensitive adhesive material 41 has a thickness for example equal to about 0.075 mm and the film 42*c* has a thickness for example equal to about 0.13 mm. The overall thickness of the vibration damping element 40 of FIG. 15*a*, without the aforementioned film 42*c*, is therefore equal to about 0.575 mm.

In the embodiment of FIG. 15*b*, the layer of metallic material 42*a* has a thickness for example equal to about 0.40 mm, a layer of rubber 42*b* has a thickness for example equal to about 0.10 mm, the other layer of rubber 42*b* has a thickness for example equal to about 0.05 mm, the layer of pressure-sensitive adhesive material 41 adjacent to the latter layer of rubber 42*b* has a thickness for example equal to about 0.075 mm and the film 42*c* has a thickness for example equal to about 0.13 mm. The overall thickness of the vibration damping element 40 of FIG. 15*b*, without the aforementioned film 42*c*, is therefore equal to about 0.625 mm.

In the embodiment of FIG. 15*c*, the layer of metallic material 42*a* has a thickness for example equal to about 0.40 mm, each of the two layers of rubber 42*b* has a thickness for example equal to about 0.14 mm and the layer of pressure-sensitive adhesive material 41 has a thickness for example equal to about 0.02 mm. The overall thickness of the vibration damping element 40 of FIG. 15*c* is therefore equal to about 0.70 mm.

In the embodiment shown in FIG. 15*d*, the vibration damping element 40 comprises a layer of metallic material 42*a* arranged between two layers of anti-rust material 42*d*. Also in this case, preferably, the metallic material is carbon steel, whereas the anti-rust material is given by a surface treatment.

The vibration damping element 40 of FIG. 15*d* further comprises a layer of pressure-sensitive adhesive material 41 associated with one of the aforementioned two layers of anti-rust material 42*d* and intended to be attached to the support frame 10.

In the case in which a layer of cold-adhesive material is used, like in the example of FIG. 15*d*, the vibration damping element 40 preferably further comprises a film 42*c* of plastic material applied to the layer of pressure-sensitive adhesive material 41 and intended to be removed before gluing the vibration damping element 40 on the support frame 10.

In the embodiment of FIG. 15*d*, the layer of metallic material 42*a* has a thickness for example equal to about 0.40 mm, each of the two layers of anti-rust material 42*d* has a thickness for example equal to about 0.02 mm, the layer of pressure-sensitive adhesive material 41 has a thickness for example equal to about 0.05 mm and the film 42*c* has a thickness for example equal to about 0.13 mm. The overall thickness of the vibration damping element 40 of FIG. 15*d*, without the aforementioned film 42*c*, is therefore equal to about 0.49 mm.

In all of the embodiments of the pad 1 of the invention, the element made of friction-wearing material 20 and the vibration damping element 40 are glued to the support frame 10.

Preferably, at least one part of the inner surface 40*b* of the vibration damping element 40 penetrates the holes 16 of the support frame 10 until it makes contact with at least one part of the inner surface 20*e* of the element made of friction-wearing material 20.

The vibration damping element 40 can take up different shapes.

FIGS. 1-3 shows a first embodiment of the pad 1 of the invention. In such an embodiment the vibration damping element 40 extends over the entire face 10*b* of the support frame 10 and has an outer profile identical to that of the latter. In particular, the surface extension of the vibration damping element 40 is in this case identical to that of the support frame 10.

The vibration damping element 40 comprises, at an upper end portion thereof corresponding to the fastening portion 11 of the support frame, a through hole 12*a* aligned with the through hole 12 of the support frame 10. A perforated rivet 13 is inserted in the through holes 12 and 12*a* to mechanically couple the vibration damping element 40 with the support frame 10 and to allow the passage of the support pin of the pad 1 to the caliper of the disc brake.

FIG. 3 shows a pneumatic piston 50 associated with the face of the vibration damping element 40 opposite to the face for coupling with the support frame 10. The pneumatic piston 50 pushes the pad 1 against the brake disc when the brake lever is actuated. When the brake lever is released, the pneumatic piston 50 goes back into its initial position and the pad 1 moves away from the brake disc through the effect of the bending of an elastic ring, known as "q-ring", in the hydraulic brakes or through the action of a suitable mechanism in the mechanical brakes.

Although not shown, the pneumatic piston 50 is foreseen also in the use of the alternative embodiments of the pad 1 described below.

Figure 4:
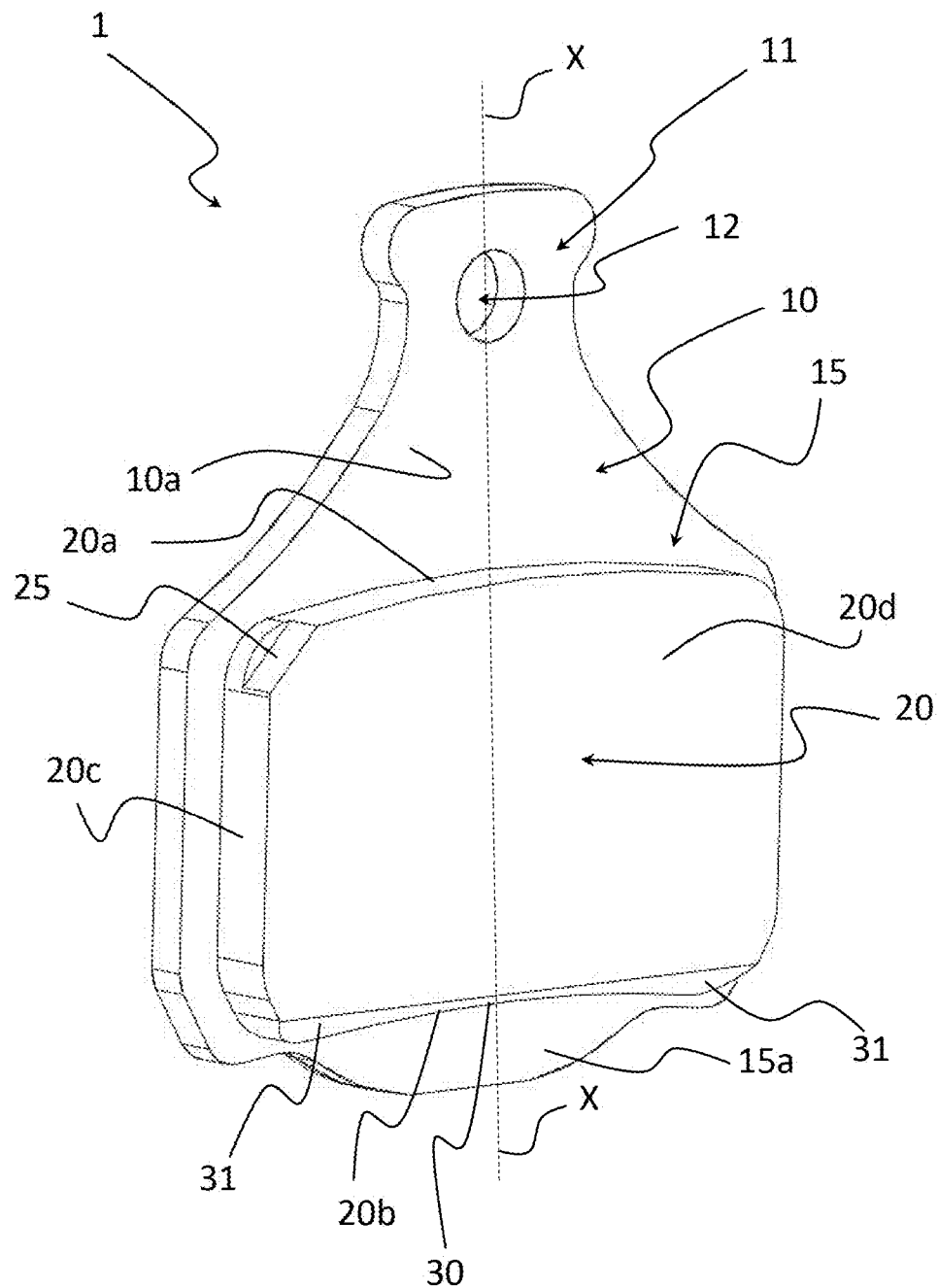
FIG. 4 is a front schematic perspective view of a second embodiment of a pad for a bicycle disc brake in accordance with the present invention.
Figure 5:
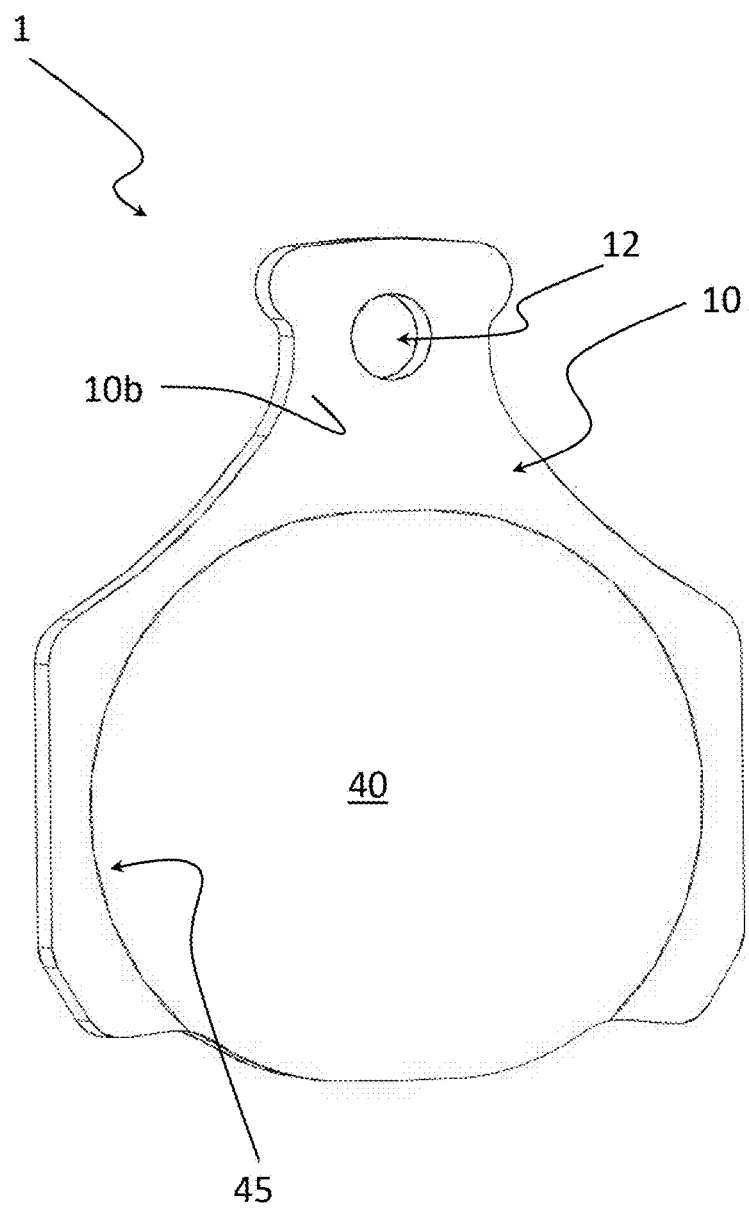
FIG. 5 is a rear schematic perspective view of the pad of FIG. 4.

FIGS. 4 and 5 show an alternative embodiment of the pad 1 of the invention. Such an embodiment differs from that of FIGS. 1-3 only in the shape of the vibration damping element 40 and for the provision, on the face 10b of the support frame 10, of a housing seat 45 for housing the vibration damping element 40, the housing seat 45 having an at least partially circular shape. Such a seat 45 has a shape that substantially copies the shape of the caliper of the disc brake and a depth greater than the thickness of the vibration damping element 40.

In the example of FIGS. 4 and 5, the vibration damping element 40 has a substantially circular shape and completely fills the seat 45.

Also in this case, a through opening 14 can be formed in the support frame 10, as described and shown with reference to FIGS. 9-14.

Figure 6:
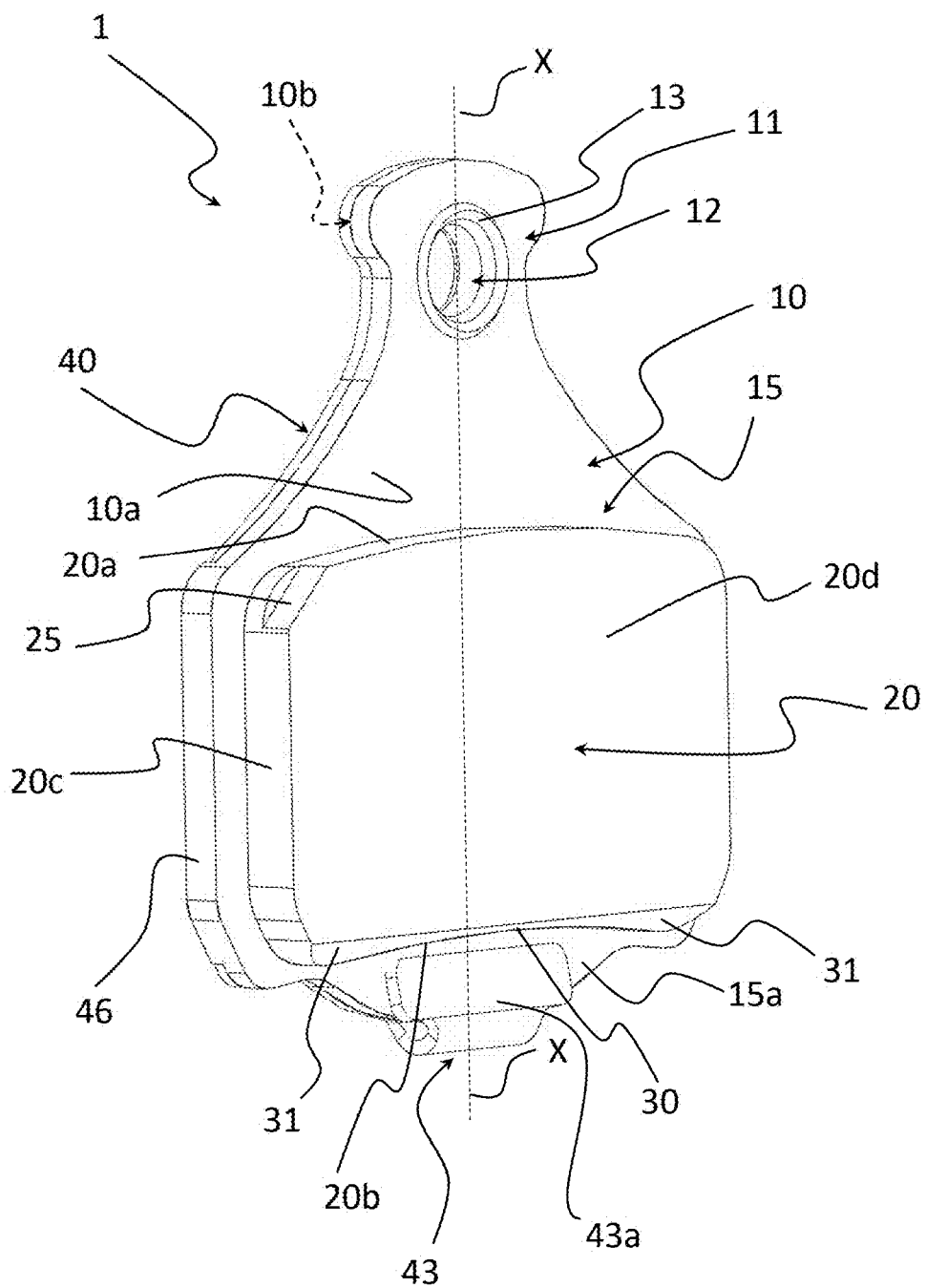
FIG. 6 is a front schematic perspective view of a third embodiment of a pad for a bicycle disc brake in accordance with the present invention.
Figure 7:
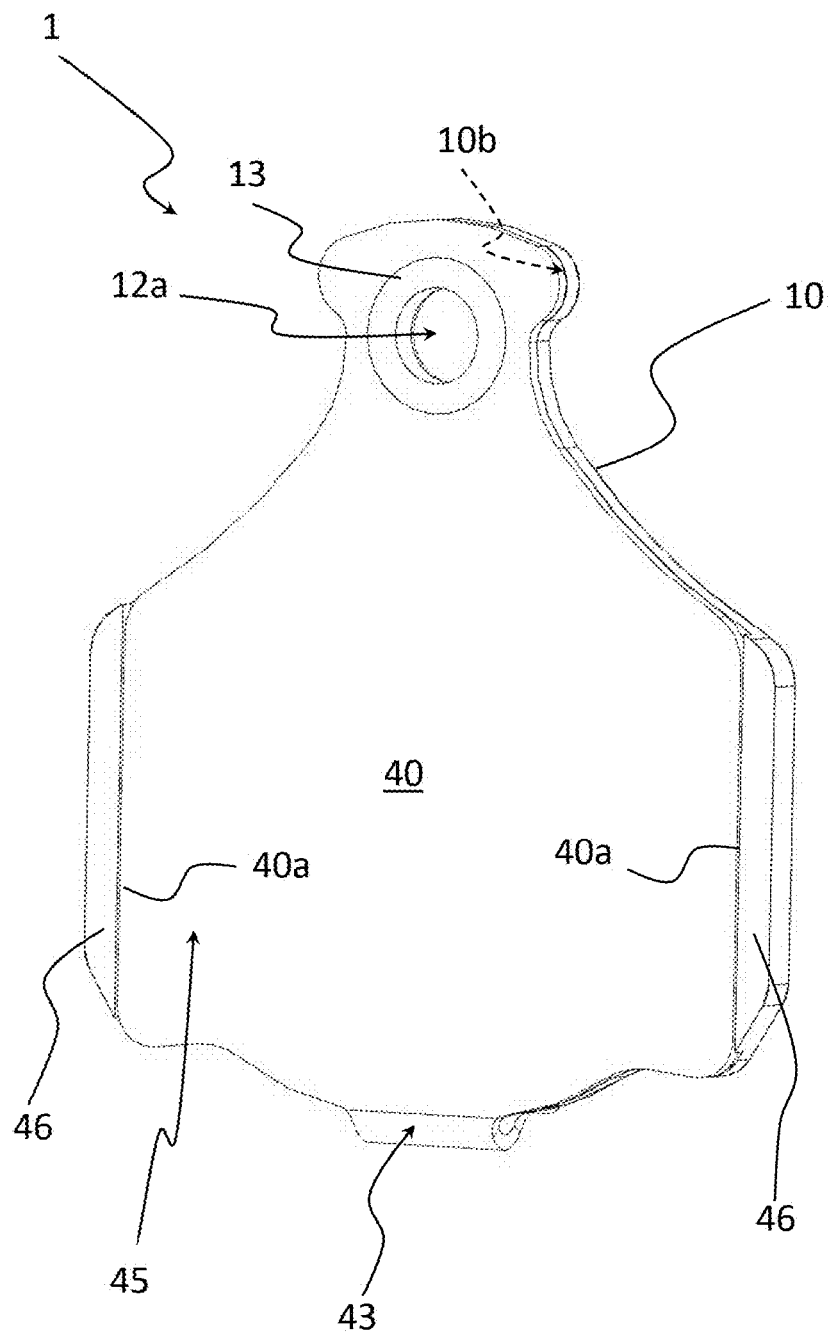
FIG. 7 is a rear schematic perspective view of the pad of FIG. 6.
Figure 8:
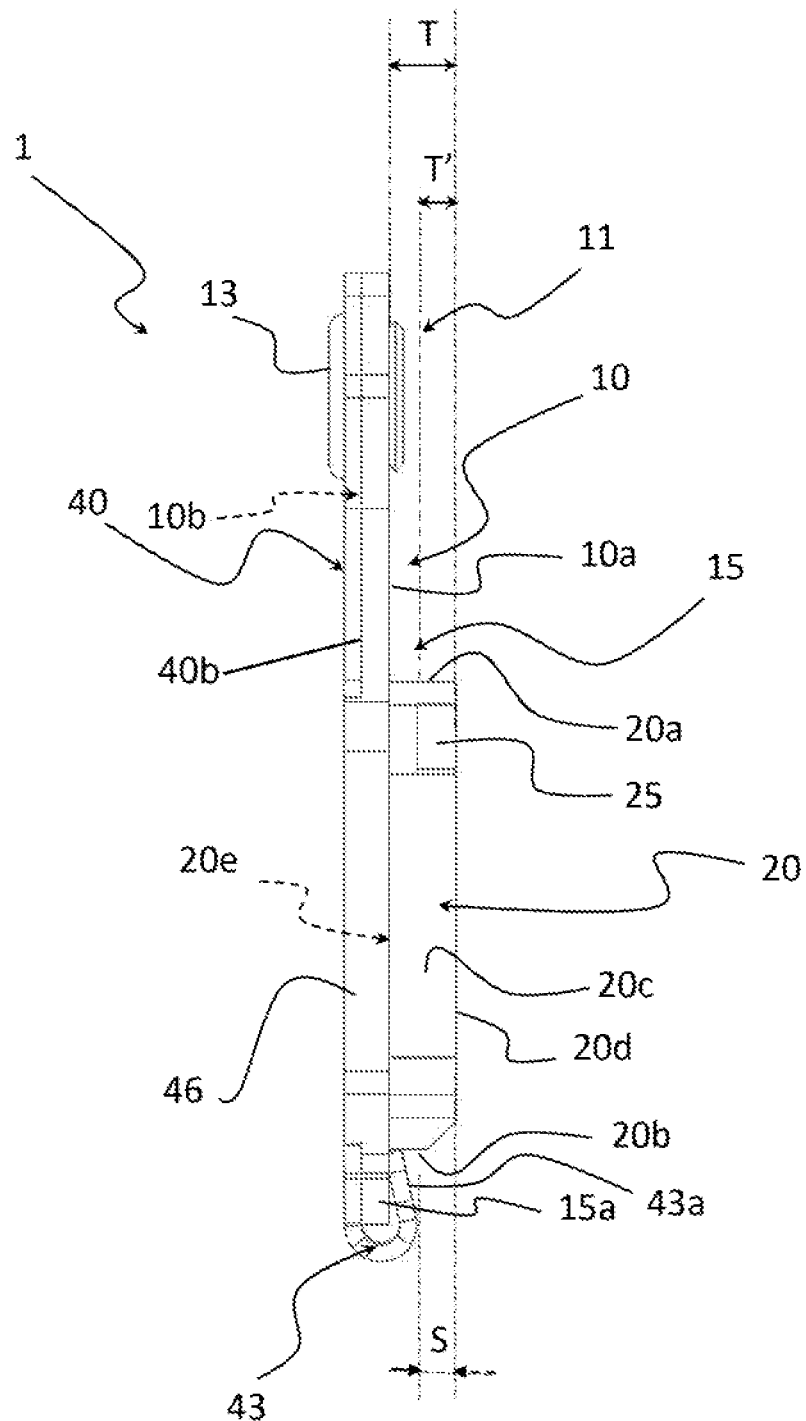
FIG. 8 is a perpendicular side view of the pad of FIG. 6.
Figure 9:
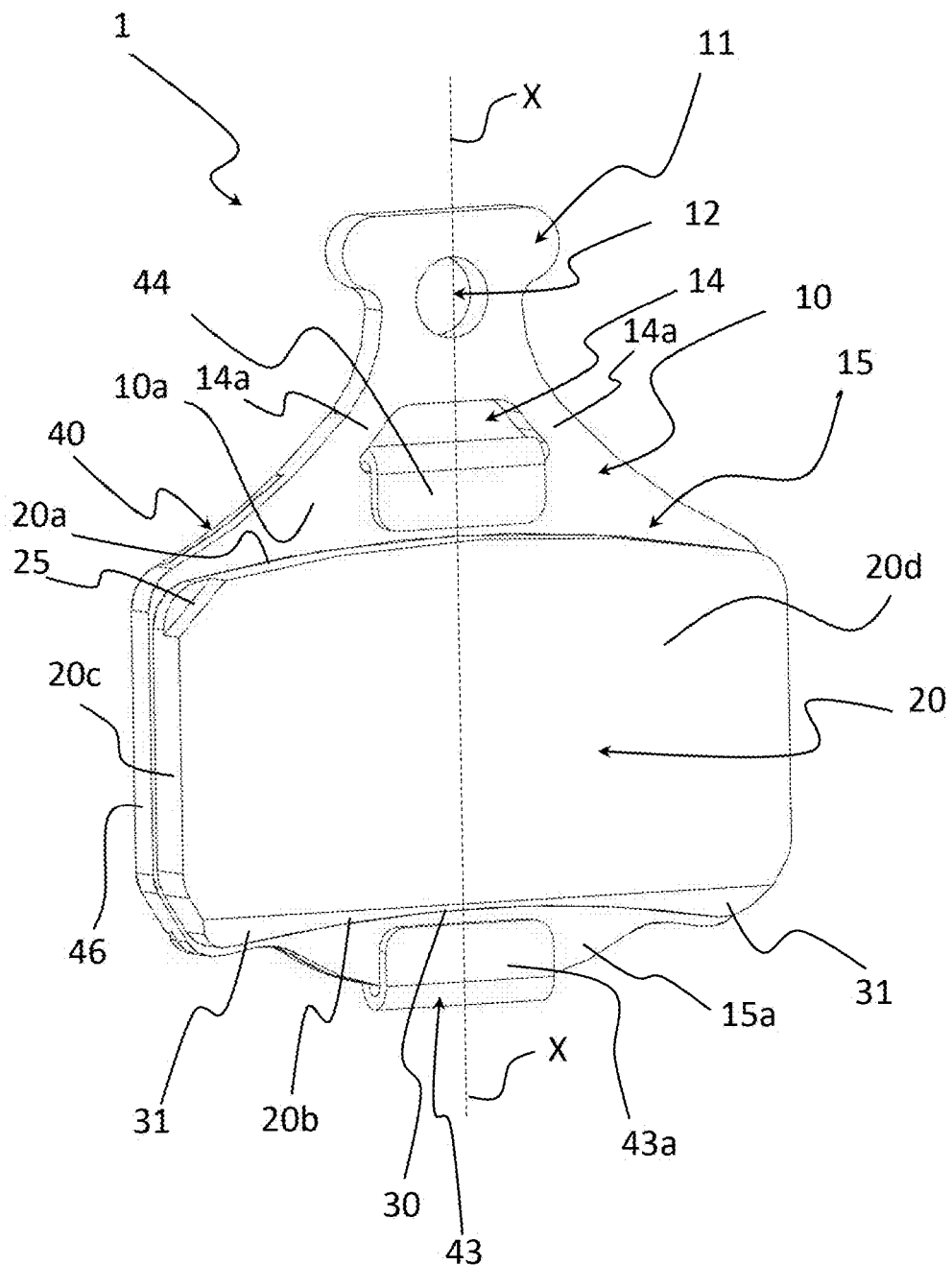
FIG. 9 is a front schematic perspective view of a fourth embodiment of a pad for a bicycle disc brake in accordance with the present invention.
Figure 10:
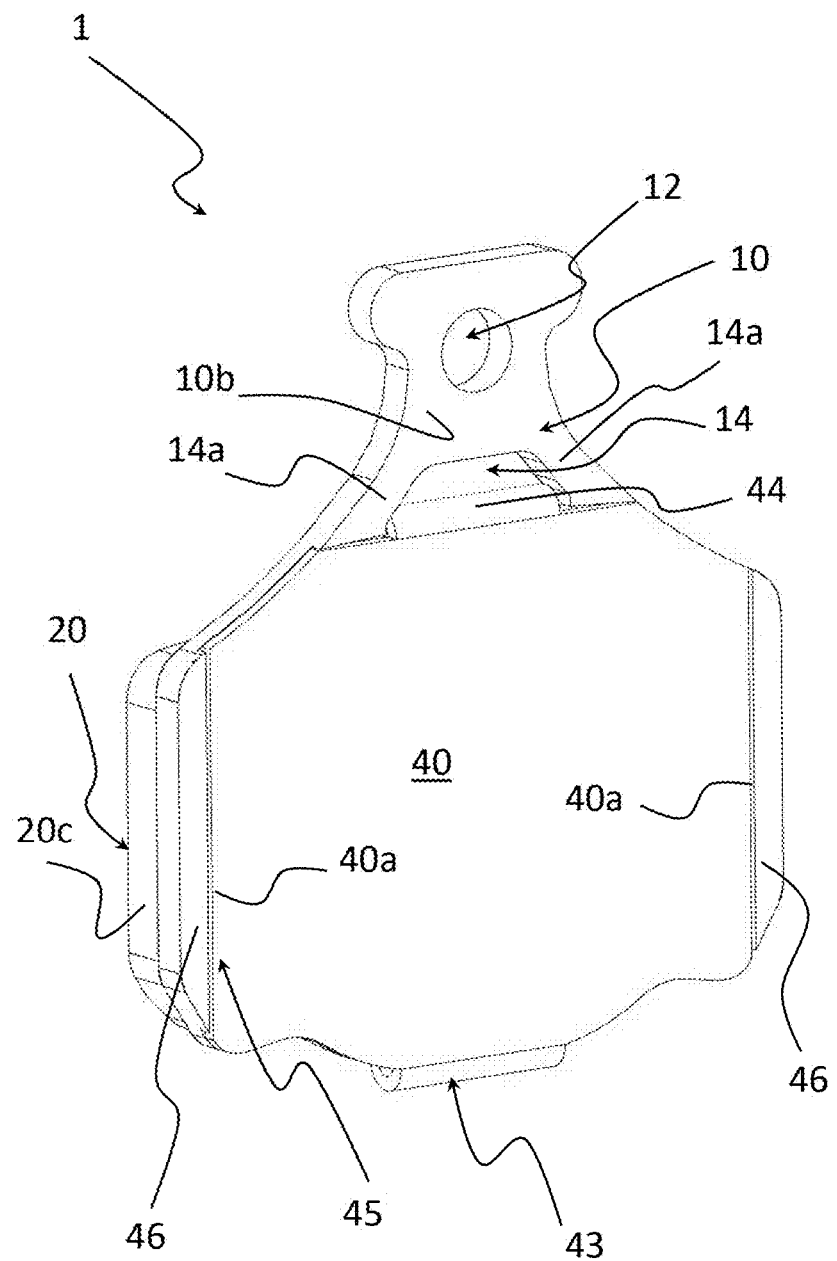
FIG. 10 is a rear schematic perspective view of the pad of FIG. 9.
Figure 11:
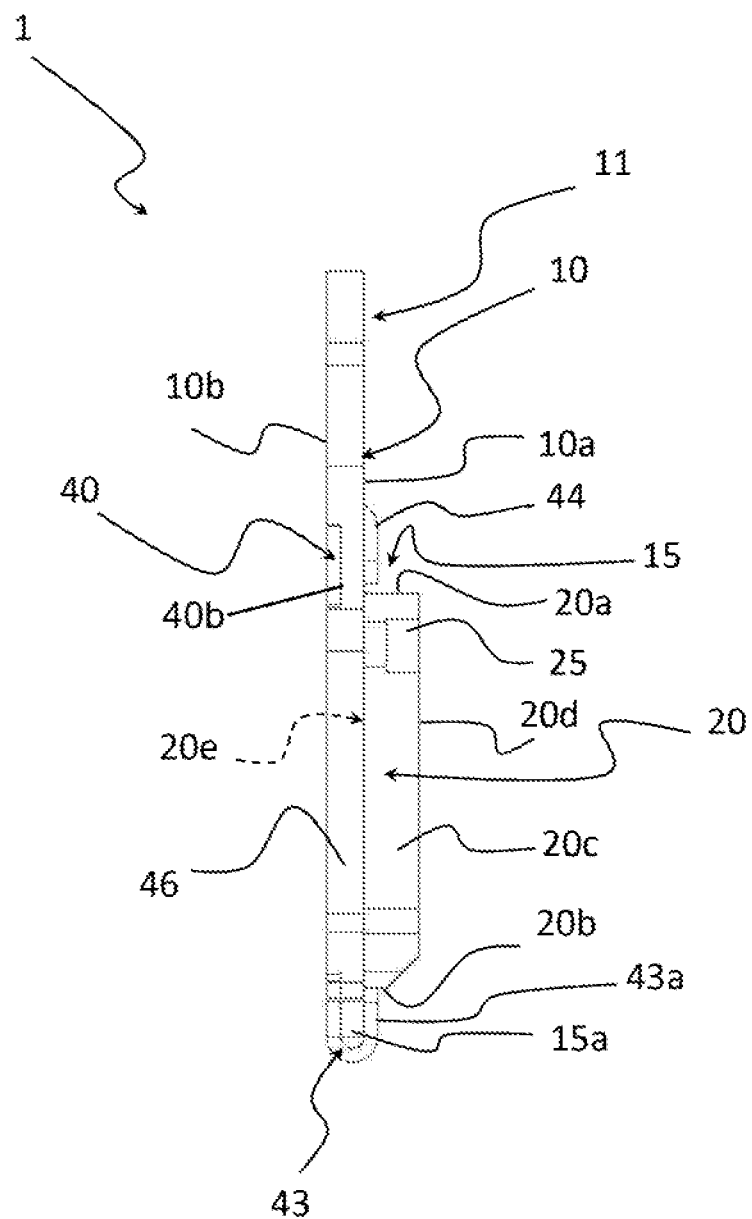
FIG. 11 is an orthogonal side view of the pad of FIG. 9.

FIGS. 6-8 show a further alternative embodiment of the pad 1 of the invention. Such an embodiment differs from that of FIGS. 1-3 only in the shape of the vibration damping element 40 and for the provision, on the face 10b of the support frame 10, of a housing seat 45 defined between two opposite shoulders 46 configured to go into abutment against opposite side walls 40a of the vibration damping element 40. Such shoulders 46 are defined at the opposite sides of the portion 15 of the support frame 10 and have a depth preferably greater than the thickness of the vibration damping element 40.

In the example of FIGS. 6-8, the vibration damping element 40 extends over the entire face 10b of the support frame 10 and has an outer profile only in part identical to that of the latter (like in the embodiment of FIGS. 1-3). Indeed, in this case the vibration damping element 40 differs from that of FIGS. 1-3 in that it comprises, at a lower portion thereof, a first lower end portion 43 that projects below the support frame 10. Such a lower end portion 43 has a part 43a folded over the face 10a of the support frame 10 without overlapping the element made of friction-wearing material 20.

In this embodiment, the vibration damping element 40, in addition to be glued to the support frame 10, is also mechanically constrained to the support frame 10 through the aforementioned folded part 43a.

As an alternative to the provision of the aforementioned part 43a, the lower end portion 43 of the vibration damping element 40 can have an increased thickness, so as to still be able to act as an indicator of the degree of wear of the element made of friction-wearing material 20.

Also in this case, a through opening 14 can be formed in the support frame 10, as described and shown with reference to FIGS. 9-14.

FIGS. 9-12 show a further embodiment of the pad 1 of the invention. Such an embodiment differs from that of FIGS. 6-8 only in the shape of the vibration damping element 40 and for the provision, on the support frame 10 and above the element made of friction-wearing material 20, of the aforementioned through opening 14.

The through opening 14 defines in the fastening portion 11 of the support frame 10 a pair of arms 14a that extend from the area of the support frame 10 in which the through hole 12 is formed to the side end areas of the upper part of the support portion 15 of the element made of friction-wearing material 20, and thus up to close to the opposite side ends thereof.

In the example of FIGS. 9-12, the vibration damping element 40 comprises an upper end portion 44, opposite to the lower end portion 43, inserted in the aforementioned through opening 14. The upper end portion 44 is folded over the face 10a of the support frame 10 without overlapping the element made of friction-wearing material 20.

In this embodiment, the vibration damping element 40, in addition to be glued to the support frame 10, is also mechanically constrained to the support frame 10 through the aforementioned folded part 43a and the aforementioned folded upper end portion 44.

With reference to FIG. 8, the outermost profile of the folded part 43a has a distance "S" from the outer surface 20d of the element made of friction-wearing material 20. Preferably, such a distance "S" is substantially equal to the thickness T' of the portion of normal wear of the element made of friction-wearing material 20.

Advantageously, the folded part 43a acts as a safety alarm for the pad 1. In fact, as the element made of friction-wearing material 20 of the pad 1 is progressively consumed, the folded part 43a gets closer to the radial arms of the disc until its outermost surface, in other words the surface opposite to the one facing the support frame 10, touches the disc itself, producing a noise. Such a noise is a warning that the maximum consumption limit of the pad 1 has been reached.

Even more advantageously, such an alarm means is useful also in the presence of the aforementioned visual wear indicator 25, in the case of non-homogeneous consumption of the element made of friction-wearing material 20.

Figure 13:
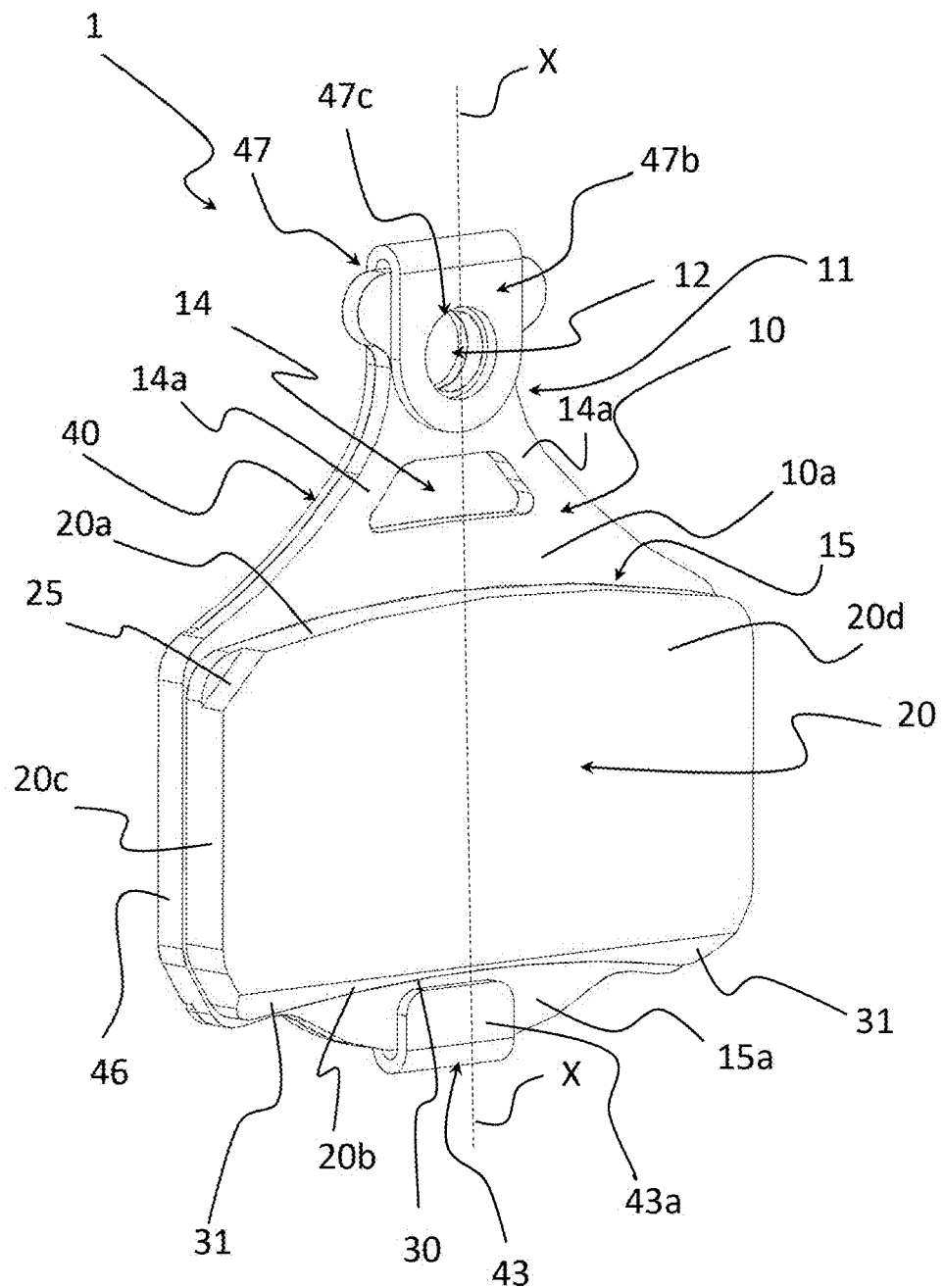
FIG. 13 is a front schematic perspective view of a fifth embodiment of a pad for a bicycle disc brake in accordance with the present invention.
Figure 14:
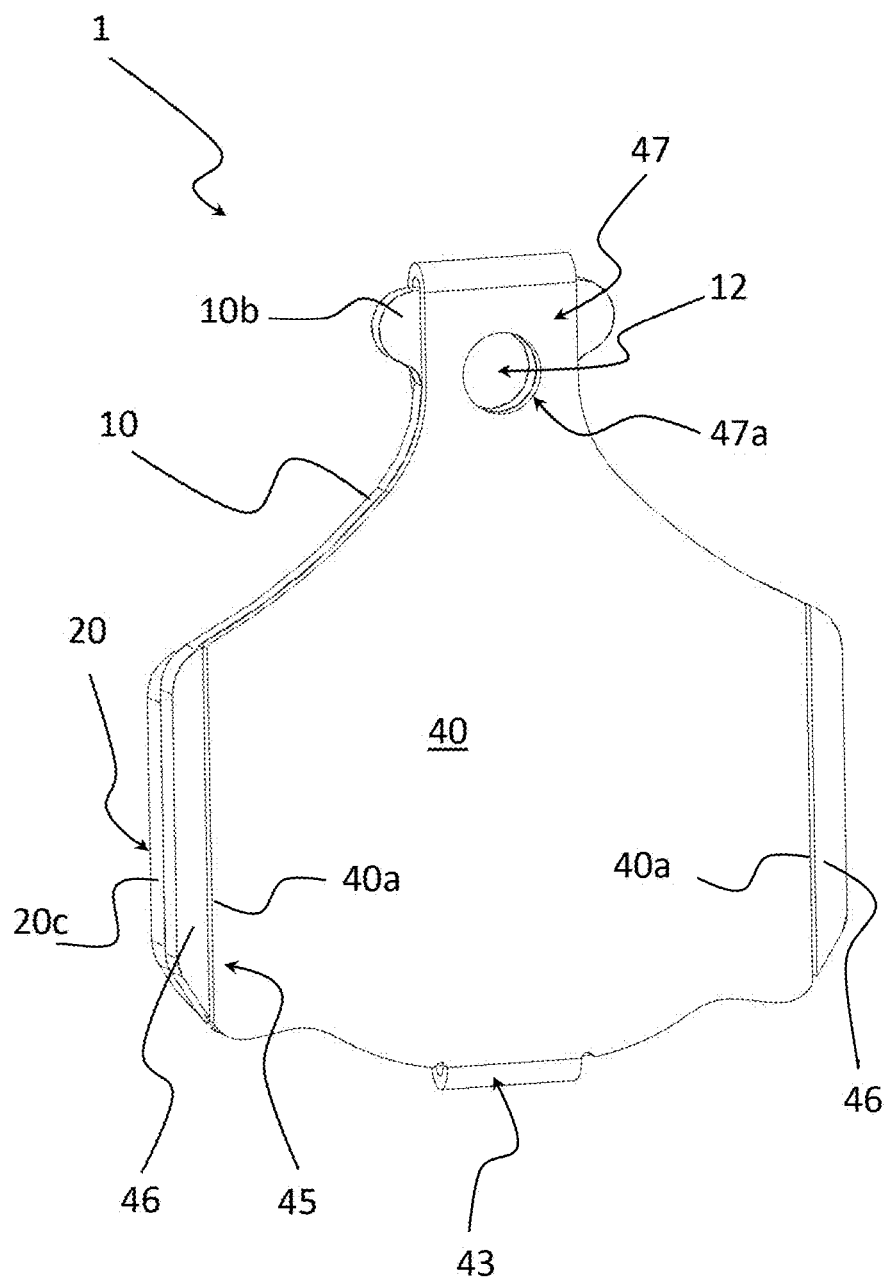
FIG. 14 is a rear schematic perspective view of the pad of FIG. 13.

FIGS. 13 and 14 show a further embodiment of the pad 1 of the invention. Such an embodiment differs from that of FIGS. 9-12 only in the shape of the vibration damping element 40. However, a further embodiment is foreseen in which the support frame 10 is totally identical to that of the embodiments shown in FIGS. 6-8, thus without the through opening 14 shown in FIGS. 9-14.

In the example of FIGS. 13 and 14, the vibration damping element 40 comprises an upper end portion 47 opposite to the lower end portion 43 and provided with a through hole 47a aligned with the through hole 12 of the support frame 10. The upper end portion 47 extends further until it projects at the top with respect to the support frame 10. The upper end portion 47 has a part 47b folded over the face 10a of the support frame 10 and provided with a through hole 47c aligned with the aforementioned through holes 12 and 47a. In this case the perforated rivet 13 is inserted in the through holes 47a, 12 and 47c.

A variant of this embodiment may not provide for the use of the perforated rivet 13.

In the embodiment of FIGS. 13 and 14, the vibration damping element 40, in addition to be glued to the support frame 10, is also mechanically constrained to the support frame 10 through the aforementioned folded part 43a and the aforementioned folded upper end portion 47.

All of the embodiments of the pad 1 described above can also be used in a manually-controlled disc brake.

Of course, those skilled in the art can make numerous modifications and variants to the pad of the present invention in order to satisfy specific and contingent requirements, all of which are in any case within the scope of protection defined by the following claims.

What is claimed is:

1. A pad for a bicycle disc brake, the pad comprising:
a support frame having a body with a first face, a second face opposite to said first face, and a through hole extending through said body and between said first face and said second face,
an element made of friction-wearing material associated with said first face of said body, and
a vibration damping element including an end portion that extends through said through hole and is folded over said body.

2. The pad according to claim 1, wherein said vibration damping element is associated with said second face.

3. The pad according to claim 1, wherein said vibration damping element further comprises a layer of pressure-sensitive adhesive material attached to said support frame.

4. The pad according to claim 1, wherein said element made of friction-wearing material and said vibration damping element comprise respective inner surfaces in contact with said support frame and wherein at least one part of an inner surface of said vibration damping element is in contact with at least one part of an inner surface of said element made of friction-wearing material.

5. The pad according to claim 1, wherein said vibration damping element comprises at least one layer of metallic material.

6. The pad according to claim 5, wherein said at least one layer of metallic material is associated with at least one layer of anti-rust material or with at least one layer of rubber.

7. The pad according to claim 5, wherein said at least one layer of metallic material is associated with at least one layer of rubber, said at least one layer of rubber being a fluoropolymer.

8. The pad according to claim 1, wherein said support frame comprises a housing seat for housing said vibration damping element.

9. The pad according to claim 8, wherein said housing seat comprises opposite shoulders configured to abut against opposite side walls of said vibration damping element.

10. The pad according to claim 1, wherein said vibration damping element includes an other end portion that projects from a lower portion of said vibration damping element.

11. The pad according to claim 10, wherein said vibration damping element is associated with said second face of said support frame.

12. The pad according to claim 11, wherein said other end portion is folded over said first face and has an outermost profile that is arranged at a distance from an outer surface of said element made of friction-wearing material, said distance being substantially equal to a thickness of a portion of normal wear of said element made of friction-wearing material.

13. The pad according to claim 10, wherein said other end portion is defined on an opposite side to said end portion, with reference to said element made of friction-wearing material.

14. The pad according to claim 1, wherein said support frame has an outer profile having a predetermined shape and wherein said vibration damping element has an outer profile having a shape substantially identical to the shape of the outer profile of said support frame.

15. A pad for a bicycle disc brake, the pad comprising a support frame, an element made of friction-wearing material associated with said support frame and a vibration damping element associated with said support frame,
wherein said support frame comprises a first through hole for attachment of the pad to a caliper of the disc brake and wherein said vibration damping element comprises a second through hole aligned with said first through hole and a fixing element inserted in said first through hole and second through hole.

16. The pad according to claim 15, wherein said second through hole is formed in an end portion of said vibration damping element, wherein said end portion has a part folded over a first face and comprises a third through hole aligned with said first through hole and second through hole.

17. The pad according to claim 16, wherein said end portion is defined on an opposite side to another end portion, with reference to said element made of friction-wearing material.

18. A pad for a bicycle disc brake, the pad comprising:
a support frame,
an element made of friction-wearing material associated said support frame, and
a vibration damping element associated with said support frame,
wherein the element made of friction-wearing material is associated with a first face of the support frame and the vibration damping element is associated with a second face of the support frame opposite the first face,
the vibration damping element comprises, at a lower portion thereof, a first end portion projecting with respect to said support frame, and said first end portion comprises a part folded over said first face;
wherein said support frame comprises a housing seat for housing said vibration damping element; and
said housing seat comprises opposite shoulders configured to abut against opposite side walls of said vibration damping element.

* * * * *